Patented Mar. 6, 1923.

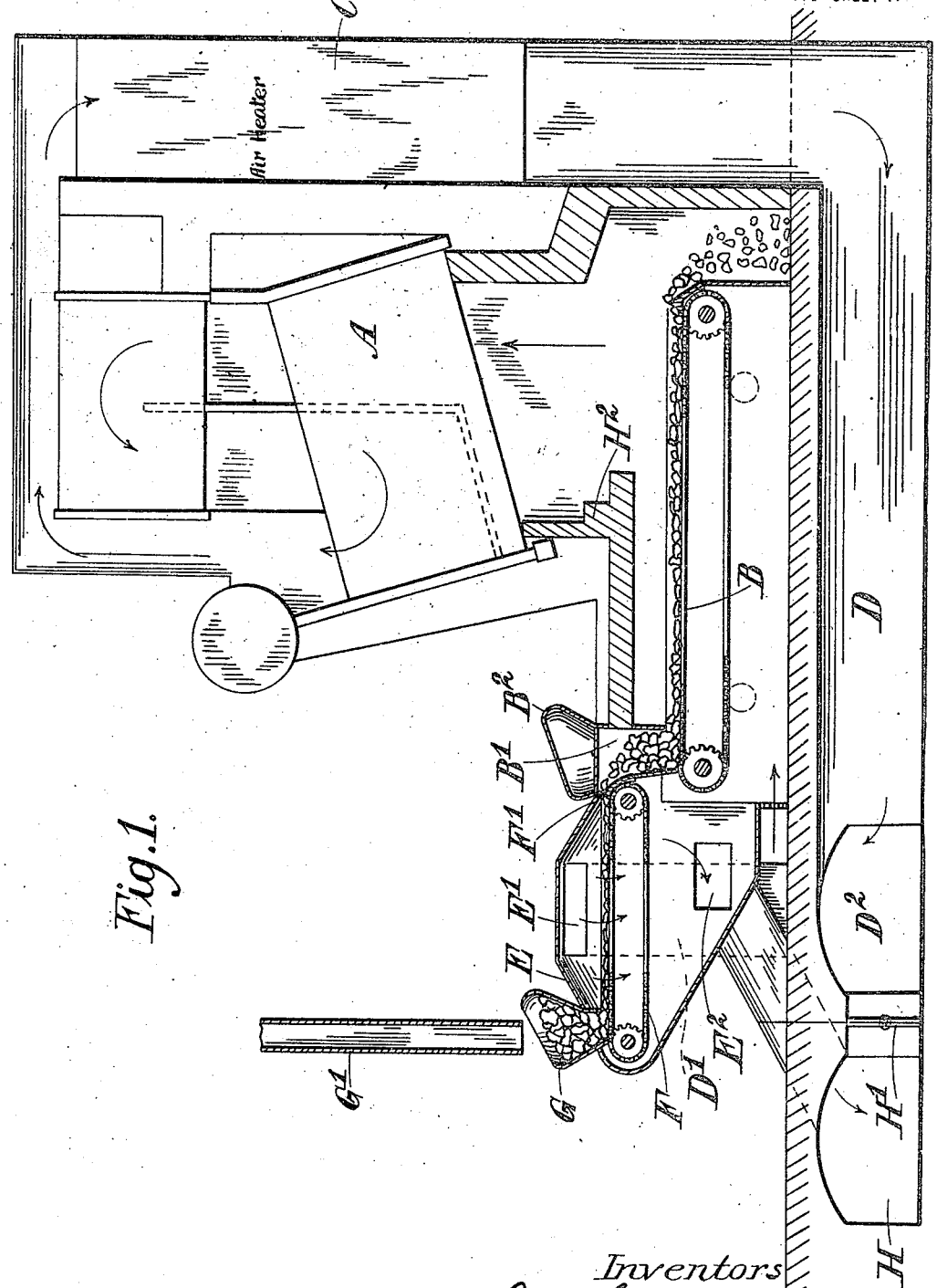

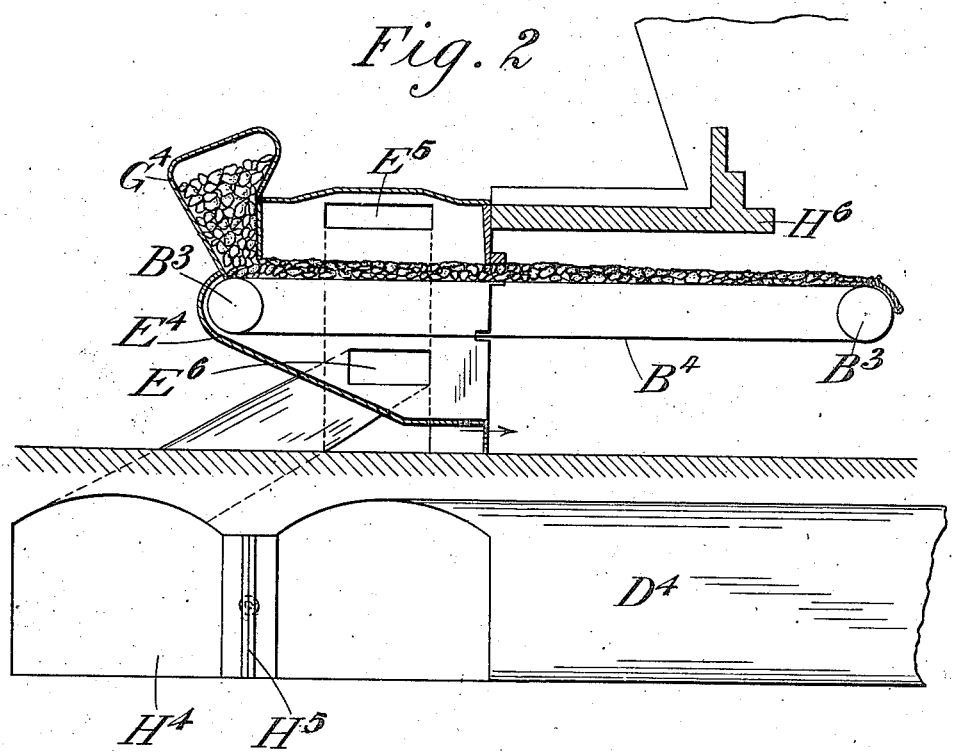

1,447,681

UNITED STATES PATENT OFFICE.

ARTHUR CUMMING MICHIE, OF NEWCASTLE-UPON-TYNE, AND EDMUND GEORGE WEEKS, OF NORTHUMBERLAND, ENGLAND, ASSIGNORS TO CHARLES HESTERMAN MERZ AND WILLIAM McLELLAN, BOTH OF WESTMINSTER, LONDON, ENGLAND.

MEANS FOR FEEDING FURNACES WITH SOLID FUEL.

Application filed November 12, 1919. Serial No. 337,574.

*To all whom it may concern:*

Be it known that we, ARTHUR CUMMING MICHIE, and EDMUND GEORGE WEEKS, subjects of the King of England, residing respectively at Newcastle-upon-Tyne, England, and Monkseaton, Northumberland, England, have invented certain new and useful Improvements in Means for Feeding Furnaces with Solid Fuel, of which the following is a specification.

This invention is for improvements in or relating to means for feeding furnaces for boilers and other purposes with solid fuel, wherein the fuel is preheated before it is brought into the combustion-space of the furnace. An object of the present invention is to increase the efficiency of furnaces.

According to the present invention in a boiler furnace system for solid fuel wherein the fuel is preheated before it is brought to the combustion-space of the furnace grate there is provided the combination of a preheating chamber outside the furnace-chamber, a perforated conveyor travelling therethrough and carrying a layer of fuel and means for directing waste or other furnace gases through that layer. The purpose of such a combination is two-fold, namely to dry and preheat the fuel and, by passing the gases through the layer of fuel, to filter out a large proportion of any dust contained in the gases before the latter are discharged into the atmosphere.

An advantage accruing from the present invention is that, as will be more fully explained hereinafter, waste of heat, which would otherwise occur, is eliminated.

The invention will be more clearly understood from the following description taken in connection with the accompanying drawings which illustrate diagrammatically two preferred constructions embodying the present invention, and in which—

Figure 1 shows a furnace and preheater having separate grates, and

Fig. 2 shows a furnace and preheater having a single grate common to both of them.

Referring to Figure 1, a boiler is indicated generally at A, and the boiler-furnace is shown as provided with a mechanical or travelling grate B. The boiler-structure preferably includes an economiser or air-heater C disposed within the passage traversed by the flue-gases which follow the course of the arrows shown in the drawings, and eventually discharge into a trunk or flue D beneath the grate.

Hitherto it has been a general practice to discharge such gases after they have been passed into contact with the requisite economisers and the like directly to the main smoke-stack or outlet.

According to the present invention, however, these gases, which it is now found still contain sufficient heat in them to dry and preheat the fuel for the boilers, are led into the upper end of a preheating chamber E by means of the flue $D^1$ in connection with the trunk D, and opening at $E^1$ into the chamber E.

Within the chamber E, is a perforated conveyor, conveniently in the form of an endless chain-band F or the like. For feeding the fuel on to the band a hopper G is provided and is supplied with fuel from a fuel-chute $G^1$. The fuel is carried forward by the band F towards the boiler grate and is discharged at $F^1$ on to the grate B.

The outlet for the gases from the chamber E is shown at $E^2$ at the lower end of the casing, and is in connection with a flue H from which gases may be withdrawn through the smoke-stack.

The band F delivers the fuel into a hopper $B^1$ and the latter is provided with a removable cover $B^2$ so that should for any reason the operation of the preheater be suspended, fuel for the grate B may be fed directly through the hopper $B^1$, access being gained to the latter by removal of the cover $B^2$.

It will be seen, therefore, that the flue gases after giving up part of their contained heat to regenerators and other heat-recovering apparatus, are passed into the preheater at its upper end where they flow downwardly to the outlet $E^2$ and thence to the main outlet passing through the layer of fuel on the chain F, during their passage through the chamber E.

In cases where the moisture contained in the fuel is low, it is not necessary or desirable to pass the whole of the flue-gases from the boiler through the fuel, as sufficient heat can be obtained from a portion of the flue-gases. In such a case the trunk D may be placed in communication with the flue H by means of a damper H¹ so that a portion of the flue gases can be by-passed direct to the outlet, part however travelling through the chamber E.

In order to prevent leakage of gases through the hopper B¹ to or from the boiler-furnace, means may be provided to equalize the gas-pressures in the hopper B¹ and the boiler-furnace. This can be effected by known means such as the provision of a fan in the duct D² communicating with the trunk D, by which means the pressure of the gases over the fuel on the conveyor F can also be suitably regulated. The provision of this fan will be readily understood, and is not illustrated in the drawings.

It is found that if the flue-gases be dusty, the dust in those gases which pass through the preheating chamber is largely entangled or filtered out during the passage of the gases through the layer of fuel contained on the chain F.

The gases employed for the purpose of preheating are at a comparatively low temperature so that no appreciable decomposition of the fuel takes place before it is fed to the furnace-grate, but the drying of the fuel and the raising of the temperature of same increases the efficiency of the fuel consumed on the furnace-grate, In Figure 2 a modified construction is diagrammatically illustrated in which a portion of the wall H⁴ of the furnace is shown, the furnace and boiler-casing having a similar construction to that of the furnace shown in Figure 1. The preheater casing is illustrated generally by the letter E⁴ and a single endless conveyor band or chain-grate B⁴ extends completely through the preheater and through the furnace and is supported on rollers B³. The grate B⁴ is fed with fuel from the hopper G⁴ and the fuel becomes heated in the preheater casing before passing into the furnace-chamber. A trunk or flue D⁴ corresponding to the trunk D of Figure 1 is in communication with a trunk opening at E⁵ into the preheater casing E⁴ above the grate B⁴. An outlet E⁶ from the preheater casing below said grate leads to the trunk H⁴. Direct communication between the trunks D⁴ and H⁴ may be controlled by the damper H⁵, are similar to the corresponding parts in the diagram illustrated in Figure 1 and a damper H¹ is provided as and for the purpose previously explained.

It will be seen that in this construction the one conveyor serves the purpose for which the two conveyors F and B were employed in the construction according to Figure 1.

It is obvious that other modifications can be made in the details of the construction without departing from the spirit of the invention, and it is to be understood that the drawings are only intended as diagrammatic illustrations of means for carrying the invention into effect. The rollers supporting the chain-grates F and B⁴ are indicated in the drawings, but no driving means are shown, as such means will be readily understood.

What we claim as as our invention and desire to secure by Letters Patent is:—

1. In a boiler furnace system for solid fuel wherein the fuel is preheated before it is brought to the combustion space of the furnace grate, the combination of a furnace chamber, a preheating chamber distinct from and outside of the furnace chamber, a perforated conveyer travelling through the preheating chamber and carrying a layer of fuel for delivery to the furnace chamber, means for directing furnace gases through said layer, and means for regulating the flow of furnace gases to the preheating chamber, whereby the temperature in the preheating chamber may be varied.

2. In a boiler-furnace system for solid fuel wherein the fuel is preheated before it is brought to the combustion-space of the furnace-grate, the combination of a preheating chamber in communication at one end with the furnace-chamber, a single perforated conveyor travelling through the preheating chamber and into the furnace to provide a grate therein, means to feed a layer of fuel on to the conveyor in the preheating chamber, and means to direct hot furnace-gases through the layer of fuel in the preheating chamber.

3. In a boiler-furnace system for solid fuel wherein the fuel is preheated before it is brought to the combustion space of the furnace grate, the combination of a preheating chamber in communication at one end with the furnace chamber, a single perforated conveyor traveling through the preheating chamber and into the furnace to form a grate therein, means for feeding a layer of fuel on to the conveyor in the preheating chamber, means to direct hot furnace gases through the layer of fuel in the preheating chamber, and means for regulating the flow of furnace gases to the preheating chamber, whereby the temperature in the preheating chamber may be varied.

In testimony whereof we have signed our names to this specification in the presence of two subscribing witnesses.

ARTHUR CUMMING MICHIE.
EDMUND GEORGE WEEKS.

Witnesses:
J. W. MONRO,
EVELYN URQUHART.